No. 836,440. PATENTED NOV. 20, 1906.
J. H. COLLINS.
CULINARY UTENSIL.
APPLICATION FILED NOV. 11, 1905.

Witnesses

Inventor
James H. Collins
By Robertson and Johnson
Attorneys

UNITED STATES PATENT OFFICE.

JAMES H. COLLINS, OF HARRISBURG, PENNSYLVANIA.

CULINARY UTENSIL.

No. 836,440.  Specification of Letters Patent.  Patented Nov. 20, 1906.

Application filed November 11, 1905. Serial No. 286,926.

*To all whom it may concern:*

Be it known that I, JAMES H. COLLINS, of Harrisburg, in the county of Dauphin and State of Pennsylvania, have invented certain new and useful Improvements in Culinary Utensils, of which the following is a specification.

My invention relates to a culinary utensil for use in cooking foods of a soft nature, such as are difficult to handle with a fork or with an ordinary knife. Among the foods in connection with which it may be employed to especial advantage may be mentioned eggs, oysters, steak, scrapple, hot cakes, &c.

Broadly speaking, this utensil comprises a knife having a thin rather wide blade and provided with a holding-lever readily controllable by the thumb of the user to retain food in position on the knife or to release it therefrom.

For a detailed description of the device reference should be had to the drawings, in which—

Figure 1:
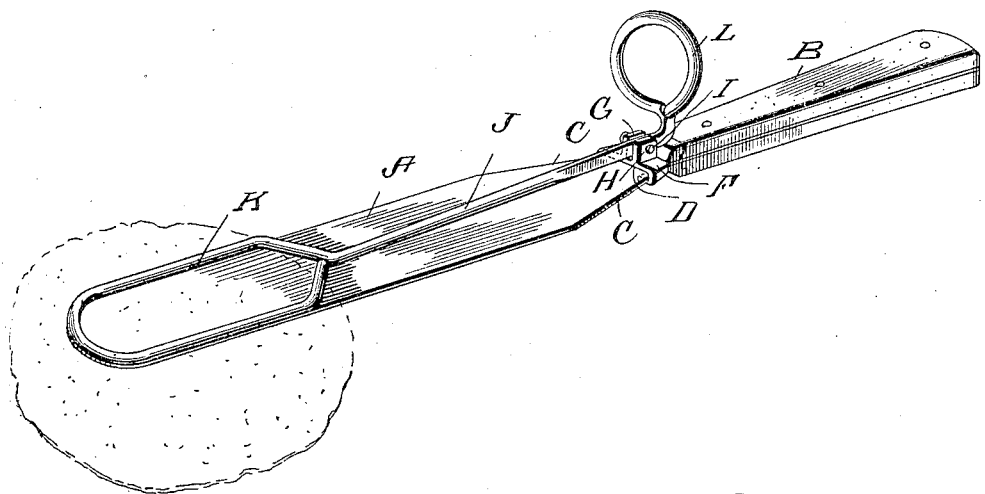
Figure 2:
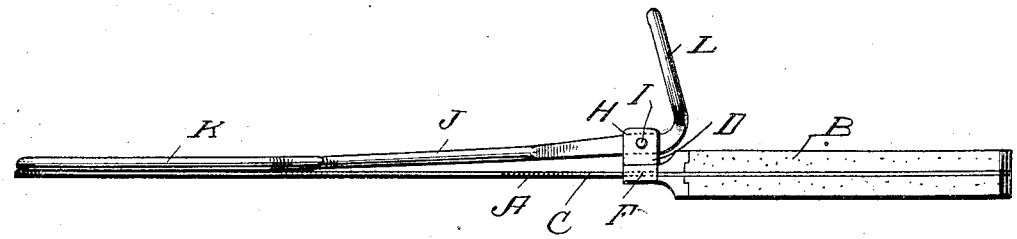
Figure 3:
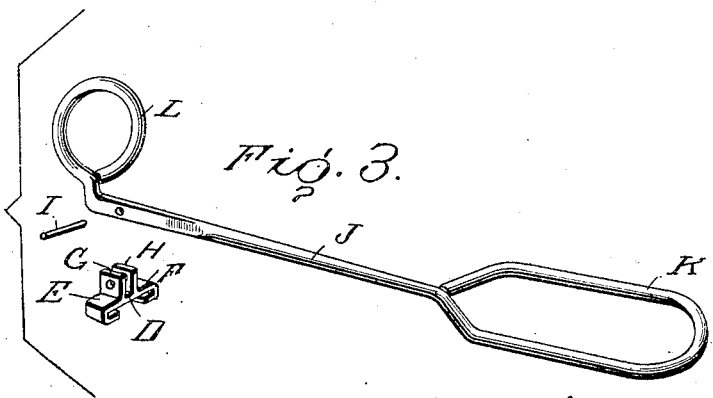

Figure 1 is a plan view of the device. Fig. 2 is a side elevation thereof, and Fig. 3 is a view in perspective of the holding-lever and the support on which it is pivoted.

The knife proper comprises a thin, rather broad blade A and a heat-insulating handle B. Near the inner end of the handle the blade is narrowed, as at C, its edges slanting gradually from the full width of the blade toward the handle. On this narrowed or slanted portion is firmly wedged a support D. This support is provided with horizontal arms E and F, which are turned in and press firmly against the under side of the blade, holding the support securely in position. The inner end of the handle is close up against the support, and thus prevents it from movement toward the handle. Movement of the support in the opposite direction is prevented not only by the turned-in arms, but by the gradual widening of the blade, which obviously makes it absolutely impossible for the support to work loose. This support is also provided with vertical posts G H, forming a fork, in which by a pin I is pivoted the holding-lever J, which, as illustrated, is in the form of a bell-crank lever and is preferably composed of a single piece of wire bent into the form of a bell-crank lever and having its outer end formed into an elongated loop K, the sides and outer end of which substantially coincide with the corresponding portion of the knife or project slightly beyond the edges thereof. Between the posts G H and adjacent to the pivot the wire is flattened in a vertical plane, so as to fill the space between the posts, thus guiding the holding-lever and retaining it at all times in proper relation to the blade. The other end of this wire after passing the pivot extends up for a short distance and is then bent in a vertical plane or in a plane inclined slightly forward into a ring L of convenient size, whereby the user by inserting his thumb into this loop and pressing down or back upon the bottom thereof is enabled to cause the outer end of the holding-lever to move away from the blade, and thus release any material held upon it. On the other hand, pressure of the thumb against the rear side of the bottom of this loop in a forward or upward direction forces the holding-lever toward the knife to hold any material which may be thereon. It is obvious that this convenient arrangement permits the holding and releasing of material varying considerably in thickness and renders it possible to manipulate readily articles which it is hard to handle in cooking with the ordinary household utensils.

The width of the blade may be increased where for certain classes of work this is desirable.

Greater rigidity may be secured by soldering the free ends of the wire to the adjacent portions of the lever.

The simplicity of this utensil commends it. The shape of the holding-loop has been found to be especially well adapted to the purposes for which it is intended, the provision of the thumb-ring above the pivot of the lever and adjacent to the thumb of the operator is of great convenience and adds to the efficiency of the device, and the immovable support for the lever is advantageous.

I am aware that holding devices provided with a pivoted member are not broadly new, but that such devices for lifting pans, &c., have already been constructed. I do not, therefore, claim, broadly, a holder of this description.

What I claim as new is—

1. In a culinary utensil, a blade, a support thereon, and a bell-crank lever pivoted to said support and comprising holding means and releasing means, said holding means consisting of a loop, substantially as described.

2. In a culinary utensil, a blade, a support thereon, and a bell-crank lever pivoted to said support and comprising two loops situated in planes at substantially right angles to each other, one of said loops corresponding in shape to a portion of the blade and the other of said loops being arranged to permit the insertion of the thumb of the user, substantially as described.

3. In a culinary utensil, a blade, a support wedged thereon, and a bell-crank lever pivotally connected to said support, said lever consisting of a single piece of wire and comprising two loops, one of which is designed to hold material upon the blade or to release it therefrom and corresponds substantially with the contour of a portion of the end of the knife having parallel side portions, and the other of said loops being of convenient size to admit the thumb of the operator, substantially as described.

4. In a culinary utensil, a blade having a narrowed or wedge-shaped inner portion, a support provided with holding-arms wedged tightly upon said narrowed portion, a handle close up against said support, and a holding-lever pivoted on said support, substantially as described.

5. In a culinary utensil, a blade, an immovable support thereon, and a lever pivoted on said support and provided with a holding-loop, an upright portion back of its pivot, and a thumb-ring above said upright portion and in a substantially vertical plane, substantially as described.

6. In a culinary utensil, a blade, an immovable support thereon having upright posts forming a fork, and a holding-lever pivoted in said support between said posts and consisting of a wire comprising holding means at one end thereof and operating means at the other and having that portion of it between the posts of the support flattened in a vertical plane to fill the space between said posts so as to guide the lever and prevent its lateral displacement, substantially as described.

7. In a culinary utensil, a blade, an immovable support thereon having upright posts forming a fork, and a holding-lever pivoted in said support and provided with holding means and operating means and with a flattened portion filling the space between the upright posts so as to guide the lever and prevent its lateral displacement, substantially as described.

Signed by me at Harrisburg, Pennsylvania, this 10th day of November, 1905.

JAMES H. COLLINS.

Witnesses:
S. L. CULLMERRY,
M. W. JACOBS.